United States Patent
Da Silva Neto

(10) Patent No.: US 8,068,922 B2
(45) Date of Patent: Nov. 29, 2011

(54) METHOD FOR OPERATING A BLOCK MODEL BASED FIELD DEVICE FOR A DISTRIBUTED AUTOMATION SYSTEM

(75) Inventor: Eugenio Ferreira Da Silva Neto, Biel-Benken (CH)

(73) Assignee: Endress + Hauser Process Solutions AG, Reinach (CH)

( * ) Notice: Subject to any disclaimer, the term of this patent is extended or adjusted under 35 U.S.C. 154(b) by 187 days.

(21) Appl. No.: 12/448,476

(22) PCT Filed: Dec. 6, 2007

(86) PCT No.: PCT/EP2007/063468
§ 371 (c)(1),
(2), (4) Date: Nov. 16, 2009

(87) PCT Pub. No.: WO2008/080757
PCT Pub. Date: Jul. 10, 2008

(65) Prior Publication Data
US 2010/0063602 A1    Mar. 11, 2010

(30) Foreign Application Priority Data
Dec. 28, 2006   (DE) .......................... 10 2006 062 477

(51) Int. Cl.
*G05B 15/02* (2006.01)
*G05B 11/01* (2006.01)
*G05B 15/00* (2006.01)
*G06F 19/00* (2011.01)
*G05B 9/02* (2006.01)

(52) U.S. Cl. .................. 700/9; 700/18; 700/20; 700/75; 700/80; 700/108; 700/149; 700/159; 700/175; 700/179; 700/204

(58) Field of Classification Search ................. 700/9, 18, 700/20, 75, 80, 108, 149, 159, 175, 179, 700/204
See application file for complete search history.

(56) References Cited

U.S. PATENT DOCUMENTS

| | | | |
|---|---|---|---|
| 6,108,616 A | | 8/2000 | Borchers |
| 6,424,872 B1 * | | 7/2002 | Glanzer et al. .................. 700/18 |
| 6,518,745 B2 | | 2/2003 | Kim |
| 7,272,457 B2 * | | 9/2007 | Glanzer et al. .................. 700/83 |
| 2002/0041181 A1 | | 4/2002 | Kim |
| 2006/0206218 A1 | | 9/2006 | Glanzer |

FOREIGN PATENT DOCUMENTS

| | | |
|---|---|---|
| DE | 69902503 T2 | 8/2000 |
| DE | 103 16 217 A1 | 11/2003 |
| DE | 102 45 176 A1 | 4/2004 |
| EP | 0 964 325 B1 | 12/1999 |
| EP | 1 022 626 A | 7/2000 |

* cited by examiner

OTHER PUBLICATIONS

Lee et al., "On-Line Fuzzy Performance Management of Profibus Networks", 2001, Elsevier, 15 pages.*

*Primary Examiner* — Albert Decady
*Assistant Examiner* — Thomas Stevens
(74) *Attorney, Agent, or Firm* — Bacon & Thomas, PLLC

(57) ABSTRACT

In a method for operating a field device working according to the block model for a distributed automation system, which exchanges data via a fieldbus, a first function block application serving for process control is provided, which makes available to other system participants process data via a first virtual field device object. In addition, a second function block application is provided, which serves for plant monitoring and which makes available to other system participants plant monitoring data via a second virtual field device object, wherein the first and second function block applications are executed according to different schedules.

5 Claims, 5 Drawing Sheets

METHOD FOR OPERATING A BLOCK MODEL BASED FIELD DEVICE FOR A DISTRIBUTED AUTOMATION SYSTEM

TECHNICAL FIELD

The invention relates to a method for operating a field device working according to the block model for a distributed automation system.

The invention relates to a method, as defined in the preamble of claim 1, for operating a field device working according to the block model for a distributed automation system.

BACKGROUND DISCUSSION

Distributed automation systems are often applied in automation technology (manufacturing automation, or process automation) for plant control. Serving for registering and/or influencing the process variables relevant for the control are so-called field devices. Examples therefor include fill level measuring devices, mass flow measuring devices, pressure and temperature measuring devices, etc., which, as sensors, register the corresponding process variables fill level, flow, pressure, or temperature.

Serving for influencing process variables are actuators, e.g. valves or pumps, via which the flow of a liquid in a pipeline section, or the fill level in a container, can be altered.

A large number of such field devices are available from the members of the firm, Endress+Hauser.

For data exchange between the field devices and superordinated units (e.g. control systems, control units, etc.), fieldbus systems are applied. The superordinated units serve for process control, process visualizing, process monitoring and plant monitoring, as well as for start-up and for servicing the field devices.

Also referred to as field devices are, generally, units, which are connected directly to a fieldbus and serve for communication with superordinated units (e.g. I/Os, gateways, linking devices, controllers). Frequently, fieldbusses are also integrated in enterprise networks, which work on an Ethernet basis, in order that process, or field device, information can be accessed from different regions of an enterprise.

For global communication, company networks can be connected with public networks (e.g. Internet).

For servicing and for start-up of the field devices, corresponding operating programs are necessary (e.g. FieldCare of Endress+Hauser; Pactware; AMS of Emerson; Simatic PDM of Siemens).

Serving for plant control of larger plants are control system applications (e.g. Simatic PCS7 of Siemens; Freelance of ABB; Delta V of Emerson).

An essential aspect of open fieldbus systems (Profibus, Foundation Fieldbus) is the interoperability and exchangeability of devices of different manufacturers. In a plant, devices (sensors, actuators, etc.) of different manufacturers can be applied together. In the case of failure of a sensor of a particular manufacturer, an option is to substitute for such a similar sensor of another manufacturer.

These requirements necessitate a clear structuring of data and functions in the individual field devices, in order to enable unified accessing. This is achieved through a standardized block model, which underlies both of the fieldbus systems, Profibus and Foundation Fieldbus.

Data and functions of a field device are, in such case, encapsulated in different blocks, which appear externally as communication objects. Each field device working according to the block model includes at least one device block (resource block), which provides all data identifying a device, e.g. device manufacturer name, serial number, hardware, and company, versions, etc. In addition to the device block, there is a transducer block, which serves for conditioning signals. As a rule, the signals are raw signals (input signals), which come from a measuring transducer and must be conditioned, before they can be fed to additional function blocks. In the transducer block, there occurs a calibrating and a linearizing of the raw signal, so that the actual measured value is available as output signal of the transducer block. A large number of predefined, basic function blocks are made available. Typical function blocks are: Analog input, analog output, digital input, digital output, PID controller, etc. These function blocks are combined to form a control strategy in the field devices with the assistance of a corresponding operating tool, e.g. ControlCare of the firm, Endress+Hauser. The so created control strategy serves exclusively for the process control.

Serving for plant monitoring (asset management) are, as a rule, corresponding application programs, which likewise run on the superordinated units.

Process control and plant monitoring are, most often, two completely separate systems. Data exchange between these systems is only implemented with considerable effort.

SUMMARY OF THE INVENTION

An object of the invention is, therefore, to provide a method for operating a field device of automation technology working according to the block model, such that an easy data exchange between a process control system and a plant monitoring system is enabled.

This object is achieved by the steps of: providing a first function block application, which serves for process control and which makes available to other system participants process data via first virtual field device object; and providing a second function block application, which serves for plant monitoring and which makes available to other system participants plant monitoring data via a second virtual field device object, wherein the first and second function block applications are executed according to different schedules.

Advantageous further developments of the invention are set forth in the dependent claims.

An essential idea of the invention is to provide two virtual field device objects in a field device, wherein the one virtual field device object is connected with a function block application serving for process control and the other virtual field device object is connected with a second function block application serving for plant monitoring. The two function block applications are executed on different schedules. Since, for plant monitoring, function block applications with corresponding function blocks are used, an easy data exchange between process control systems and plant monitoring systems is possible.

BRIEF DESCRIPTION OF THE DRAWINGS

The invention will now be explained in greater detail on the basis of an example of an embodiment illustrated in the drawing. The figures of the drawing show as follows.

DETAILED DISCUSSION IN CONJUNCTION WITH THE DRAWINGS

Figure 1:
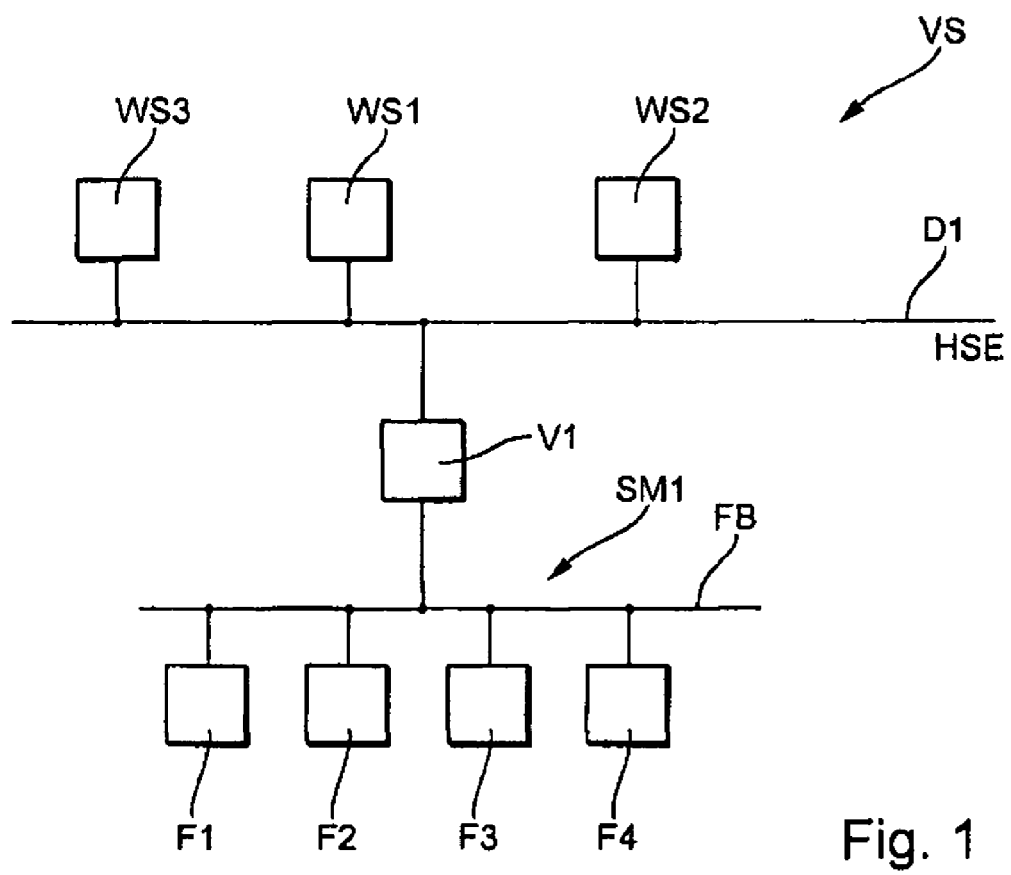
FIG. 1 shows a distributed automation system in schematic representation.

FIG. 1 shows a distributed automation system VS in greater detail. Connected to a data bus D1 are a number of computer units (workstations) WS1, WS2, WS3. These computer units serve as superordinated units, among other things, for process visualizing, process monitoring and for engineering, as well as for servicing and monitoring of field devices. Data bus D1 works, for example, according to the HSE (High Speed Ethernet) standard of Foundation Fieldbus. Via a linking unit V1, the data bus D1 is connected with a fieldbus segment SM1. The linking unit V1 can be, for example, a control unit (FieldController of the firm, Endress+Hauser). The fieldbus segment SM1 is composed of a plurality of field devices F1, F2, F3, F4, which are connected with one another via a fieldbus FB. The field devices F1, F2, F3, F4 can be sensors, as well as also actuators. Fieldbus FB works, for example, according to the fieldbus standard of Foundation Fieldbus.

Figure 2:
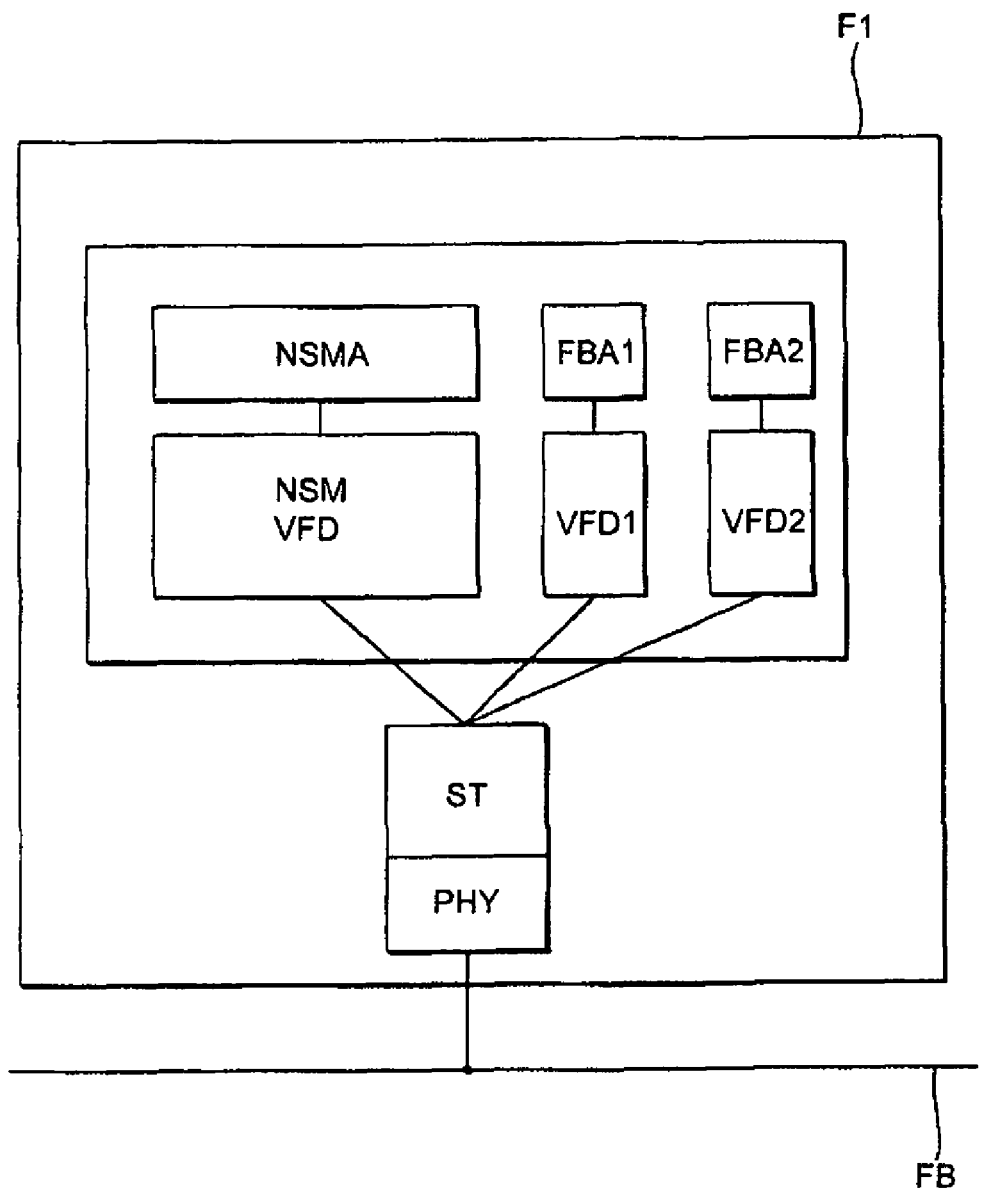
FIG. 2 shows a field device of a distributed automation system of FIG. 1.

FIG. 2 shows, schematically, one of the field devices, for example, field device F1. The physical connection of the field device F1 with the fieldbus occurs via an interface PHY, which is embodied as a fieldbus interface. This fieldbus interface adapts the physical signal to the used fieldbus standard. The protocol specific adapting occurs in a communication stack (communication stack) ST. This communication stack ST is connected with a plurality of virtual field device objects (virtual field devices). These virtual field device objects make available all communication objects and their object descriptions transmittable via the fieldbus. One virtual field device object is the network and system management object NSM VFD connected with a network and system management application NSMA. Another virtual field device object is the object VFD1, which is connected with a function block application FBA1. These objects and applications are known in the case of conventional field devices.

According to the invention, a further virtual field device object VFD2 is provided in the field device F1, which is connected with a function block application FBA2.

Function block application FBA1 serves for process control. Function block application FBA2 serves for plant monitoring.

Figure 3:
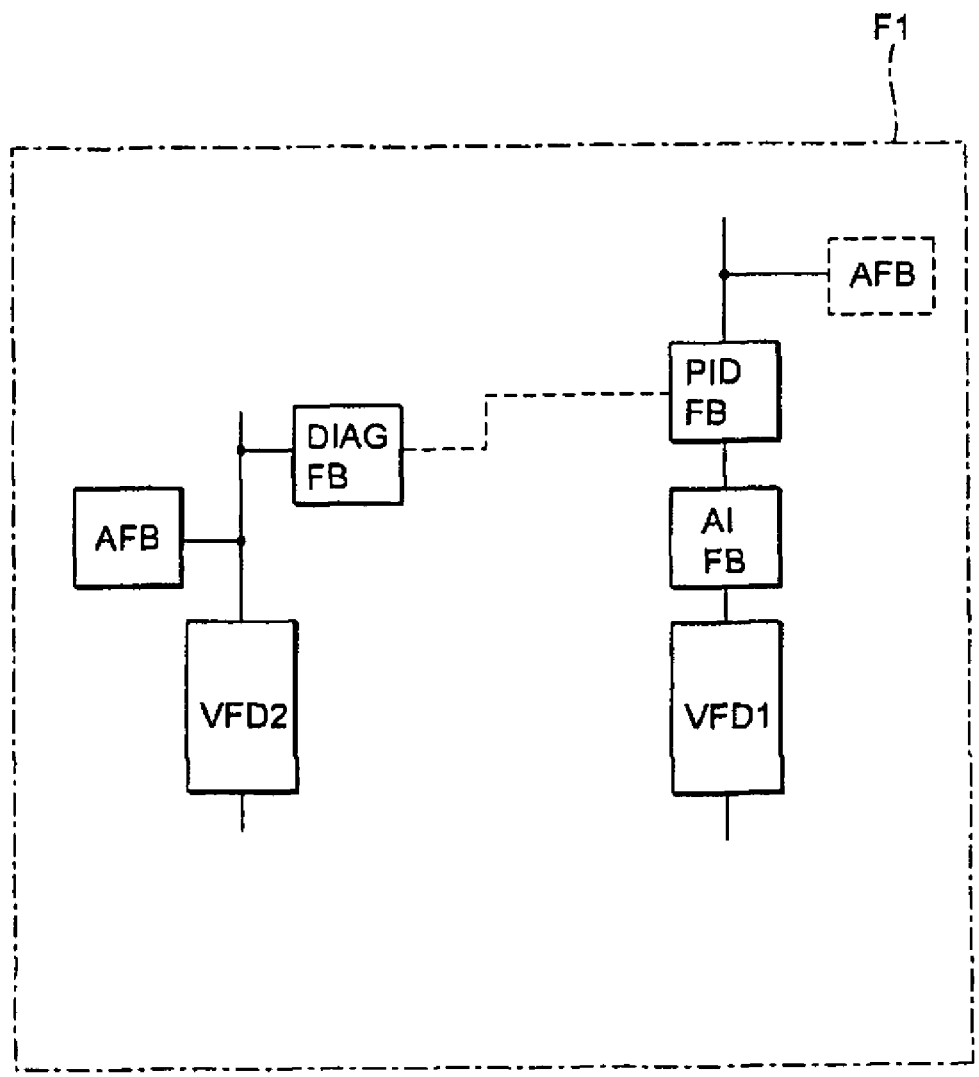
FIG. 3 shows a function block application in a field device of FIG. 2 in schematic representation.

These two function block applications are in FIG. 3 presented in greater detail. The virtual field device object VFD2 is connected with a plant monitoring function block AFB and a diagnostic function block DIAG FB. With the help of the diagnostic function block DIAG FB, device-specific diagnostic information is queried, or ascertained. The plant monitoring function block AFB processes plant monitoring relevant information. Both of these function blocks are so called flexible function blocks, for which Foundation Fieldbus has created corresponding specifications.

The virtual device-object VFD1 is connected with a conventional standardized AI function block AI FB. The AI function block AI FB is connected with a PID controller function block PID FB. Moreover, in the view of the function block application FBA1, the plant monitoring function block AFB can be seen; therefore this is shown dashed. Data exchange between the diagnostic function block DIAG FB and the control function block PID FB is also shown dashed. The plant monitoring function blocks AFB and DIAG FB are implemented according to IEC61131-3 programming and are executed in the function block environment made available by the field device F1. In this way, an easy exchange between a process control system and one in the plant monitoring system is possible. The differentiating of plant monitoring and process data already at the field device level makes possible an easy data exchange. If the field device F1 is, for example, a pH electrode and the diagnostic function block DIAG FB reports that the pH electrode is fouled, then this information is forwarded to the PID controller function block, which then switches the PID control function block PID FB into a safety mode, since, in this case, safe operation of the plant is possibly no longer assured. Corresponding connections between the function blocks can be effected simply with conventional operating tools.

Figure 4:
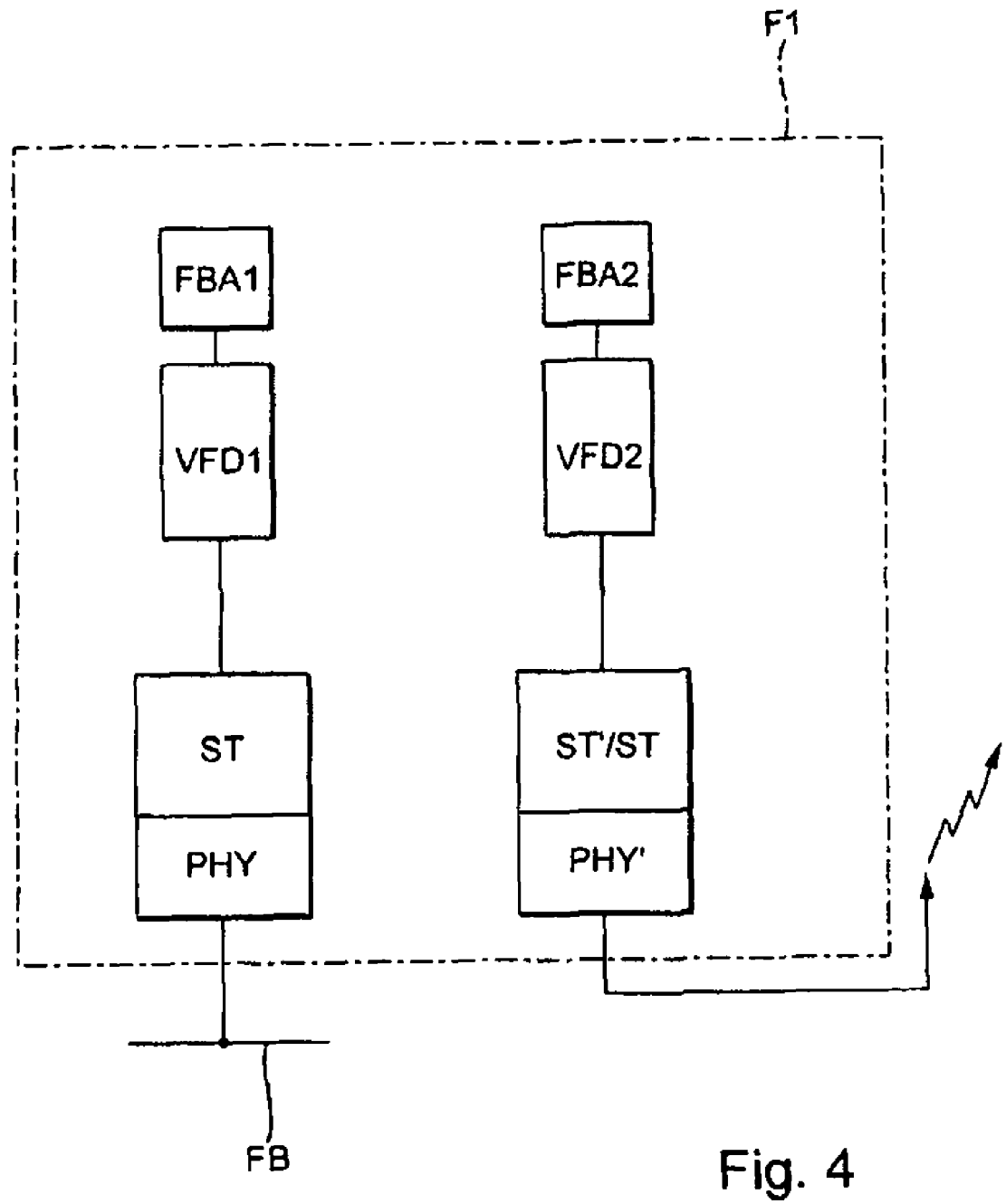
FIG. 4 shows a function block application according to FIG. 3 with different interfaces.

FIG. 4 shows an alternative embodiment of the invention. In such case, the virtual field device objects VFD1, VFD2 access different communication interfaces. The communication blocks of the conventional virtual field device object VFD1 are, in ordinary manner, made available to other system participants via the fieldbus FB. The second virtual field device object VFD2 is connected with a radio interface PHY', which exchanges data wirelessly with other system participants. Thus the plant monitoring relevant data are transmitted on a completely different communication channel. This unloads the data transmission rate on the fieldbus FB.

The transmission on this communication channel can also occur according to another protocol. This is indicated by the communication stack ST'.

Depending on application of the function block sets (process control, plant monitoring), memory ranges and logical data structures can be dynamically assigned. If only plant monitoring functions are required, then the entire available memory capacity can be assigned to these functionalities.

Included under plant monitoring is also state monitoring in the context of condition monitoring.

Figure 5:
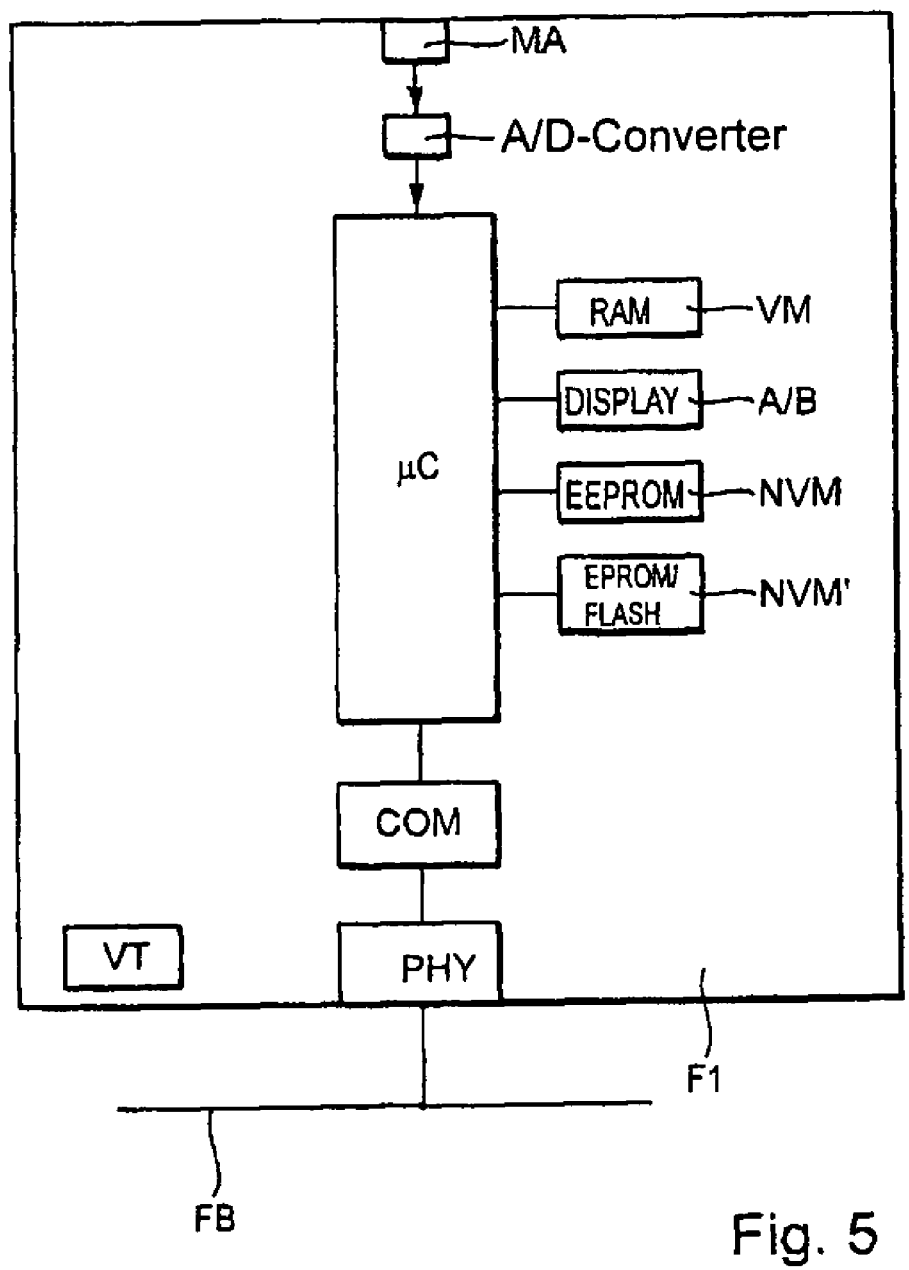
FIG. 5 is a block diagram of a field device of FIG. 1.

FIG. 5 shows the hardware related construction of the field device F1 in greater detail. A microcontroller µC is connected with a measuring transducer MA, which serves for registering a process variable, e.g. a pH value. Connected to the microcontroller µC are a number of memory units. A memory VM serves as temporary, volatile, working memory. Serving as program memory for the microcontroller µC is EPROM memory or flash memory. In a non-volatile, writable, data memory NVN, e.g. an EEPROM memory, are stored parameter values. For measured value display and for servicing, a display/service unit AB is provided, which includes a display and a number of pushbuttons.

Serving for communication with the fieldbus is communication controller COM, after which a fieldbus interface PHV is connected. The communication stack, or stacks, is/are implemented in the communication controller COM.

Serving for energy supply of the device is a supply part VT, which either is connected with an external supply unit or draws its energy from the fieldbus FB via the fieldbus interface PHY.

The invention claimed is:

1. A method for operating a field device working according to a block model for a distributed automation system that exchanges data via a fieldbus, comprising the steps of:
    providing a first function block application, which serves for process control and which makes available to other system participants process data via a first virtual field device object; and
    providing a second function block application which serves for plant monitoring and which makes available to other system participants plant monitoring data via a second virtual field device object, wherein:

the first and second function block applications are executed according to different schedules.

2. The method as claimed in claim 1, wherein:
the second function block application includes a diagnostic function block, which registers device-specific, diagnostic information.

3. The method as claimed in claim 1, wherein:
the second function block application includes a plant monitoring function block, which provides plant monitoring information.

4. The method as claimed in claim 1, wherein:
a function block of the first function block application and a function block of the second function block application exchange data.

5. The method as claimed in claim 1, wherein:
the first and second virtual field device objects are connected with different interfaces and/or communication stacks.

* * * * *